3,448,531
DRY COLOR MIXER
James W. Robinson, 1205 Graydon Ave., and Joseph
Frank Porter, 900 Brandon Ave., both of Norfolk, Va.
23507
Filed Sept. 13, 1965, Ser. No. 486,997
Int. Cl. G09b *19/00, 25/00*
U.S. Cl. 35—28.3         8 Claims

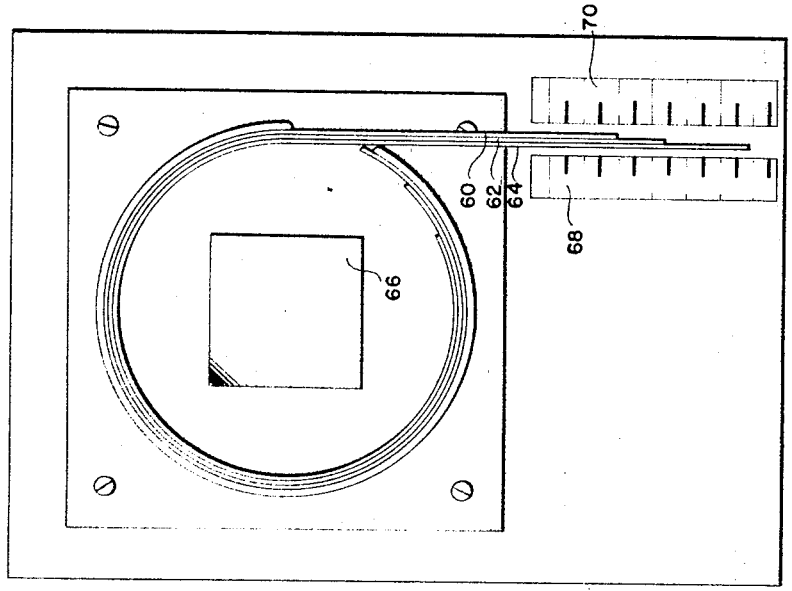
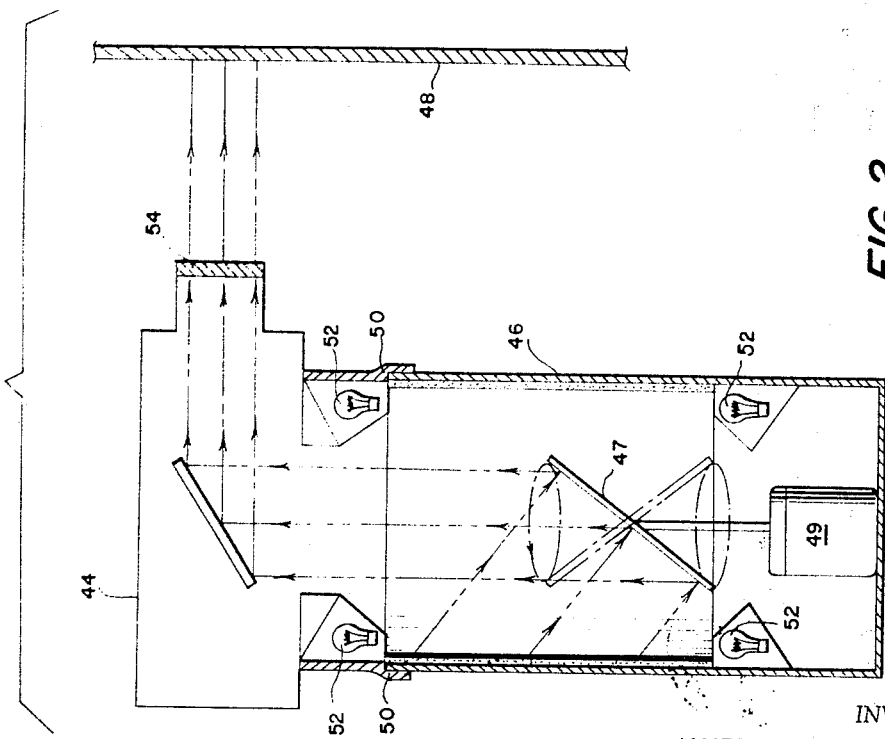
INVENTORS
JAMES W. ROBINSON
J. FRANK PORTER
BY Semmes & Semmes
ATTORNEYS United States Patent Office 3,448,531
Patented June 10, 1969

ABSTRACT OF THE DISCLOSURE

A device for blending the dry colors on a plurality of panels. Means is provided for exposing predetermined portions of each panel. The exposed portions of the colored panels are viewed by means of a rotating mirror.

---

The present invention relates generally to a dry color mixer characterized by its simplicity in construction.

Although color blenders are the subject of numerous U.S. patents, the present invention is believed to constitute an important contribution to this field as selectively changeable colors may be displayed with the use of a simple and inexpensive device.

Accordingly, an object of the present invention is to provide for dry color mixing with a device characterized by its portability, simplicity in construction and low manufacturing cost.

Another object of the present invention is to provide for dry color mixing with a device capable of permitting either "direct" or "projected" observation.

Still a further object of the present invention is to provide for dry color mixing in a device capable of directly measuring the quantities of color being mixed.

Still further objects of the present invention will become apparent from the ensuing specification and attached drawings, wherein:

FIG. 2 is a sectional view of a second embodiment of the present invention providing for the projection of color mixing upon a wall or screen; and FIG. 3 is a schematic diagram illustrating the direct measurement of quantities of mixed color applicable to either the FIG. 1 or FIG. 2 embodiments.

Figure 1:
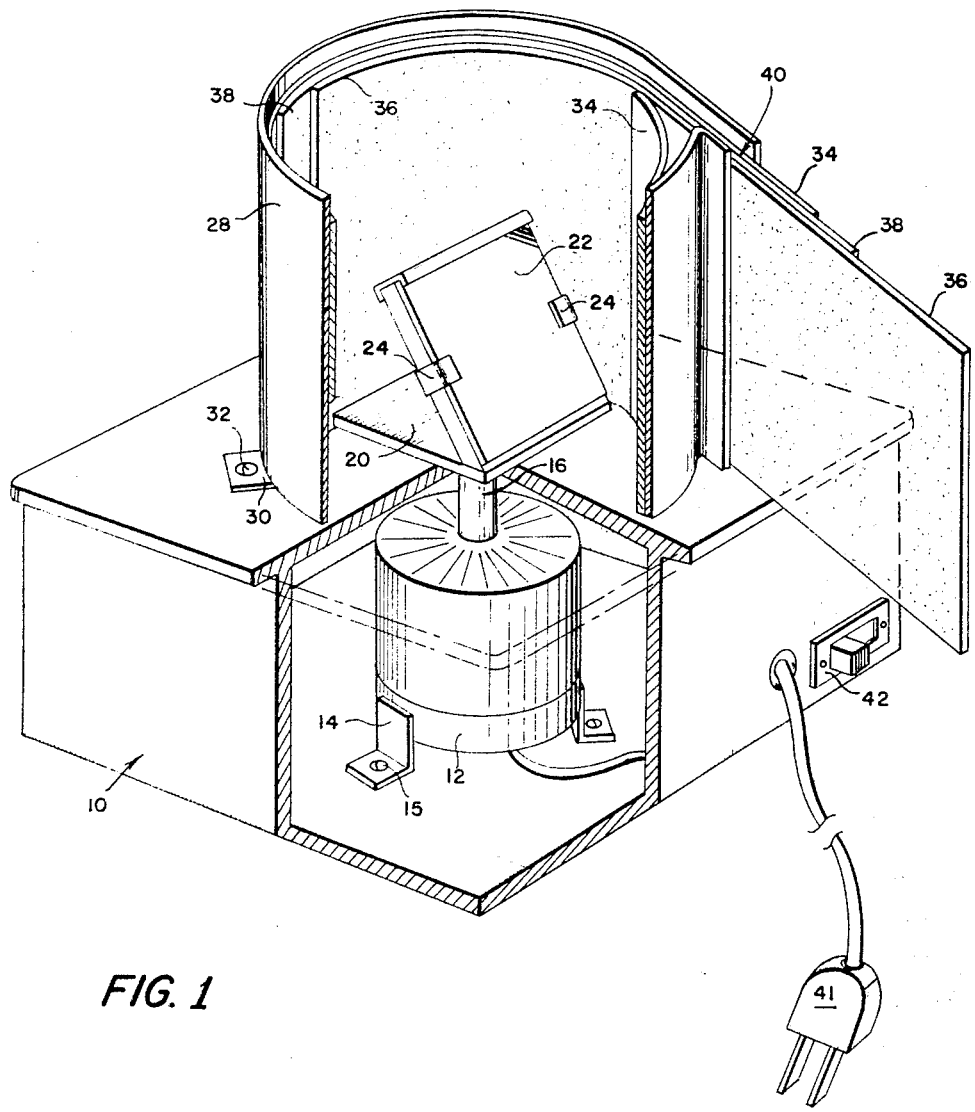
FIG. 1 is a perspective view of a first embodiment of the present invention providing for direct observation of color mixing.

As seen in FIG. 1, the first embodiment of dry color mixer consists of a casing 10 to which motor 12 is mounted with the use of brackets 14 and fasteners 15. Attached to shaft 16 of motor 12 is a supporting assembly generally designated by the reference numeral 20, to which mirror 22 is attached with the use of bracket 24.

Mounted upon the top surface of casing 10 is a generally cylindrical housing 28 so configured as to provide for the selective introduction of flexible color panels discussed in detail hereinafter. The bottom portion of cylindrical housing 28 terminates in a plurality of depending tab portions 30 which are attached to the top of casing 10 with bolts 32. For purposes of illustrating the present invention, flexible color panels 34, 36 and 38, representing the primary yellow, blue and red colors respectively, are shown as passing through slot 40 of housing 28 in surrounding relationship to mirror 22. Located on one side of casing 10 are plug 41 and motor actuating switch 42 which cause mirror 22 to rotate at desired speed, accurately reflecting quantitatively the resultant mixture of percentages of color panels 34, 36 and 38 exposed to mirror 22. Obviously, variation in color mixing is achieved by regulating the portions of panels 34, 36 and 38 exposed to mirror 22, as desired.

In the embodiment of FIG. 2, an opaque projector 44 is employed in conjunction with housing 46, which contains mirror 47 run by motor 49, to permit resultant mixed colors to be shown on a wall or screen 48. Although the dry color mixing housing 46 of the FIG. 2 embodiment is illustrated somewhat differently from that of FIG. 1, it is obvious that offset lip portion 50, located at the bottom edge of projector 44, is so designed as to enable attachment of projector 44 to the cylindrical housing 28 of the first embodiment of FIG. 1, if desired. In the FIG. 2 embodiment, a plurality of light sources 52 are disposed about the periphery of housing 46 while a focusing lens 54 is provided for projector 44. While any system of color panels (not illustrated) may be employed within housing 46, the arrows of FIG. 2 illustrate generally the direction of light.

FIG. 3 illustrates schematically a system for measuring the percentages of "exposed" color panel, applicable generally to either the FIG. 1 or FIG. 2 embodiments. While color panels 60, 62 and 64 designate generally the primary colors yellow, blue and red, it is apparent that white and black panels may also be employed in accordance with the teachings of the present invention. The percentages of color panels 60, 62 and 64 exposed to mirror 66 may be read on scale 68, which, in turn, may be directly translated into quantities of coloring required on scale 70, such as ounces of paint, for example.

Manifestly, modifications in technique may be employed to duplicate the results obtainable by the present invention without departing from the scope of invention, as defined by the sub-joined claims.

I claim:
1. A dry color mixer, comprising:
  (A) a mounting assembly;
  (B) motor means attached to said mounting assembly;
  (C) a housing supported upon said mounting assembly;
  (D) at least two panels of selected color;
  (E) means for selectively positioning said panels within said housing to expose predetermined portions of said panels to the inside of said housing; and
  (F) a sloping mirror located within said housing and mounted upon said motor means for rotation therewith, said mirror being exposed to said predetermined portions of said panels as it rotates, while permitting observation of same.

2. A dry color mixer as in claim 1, including projector means detachably mounted upon said housing.

3. A dry color mixer as in claim 1, including scale means for measuring directly the percentage of color of said panels exposed to said mirror.

4. A dry color mixer, comprising:
  (A) a mounting assembly;
  (B) motor means attached to said mounting assembly;
  (C) a sloping mirror mounted upon said motor means for rotation therewith;
  (D) a cylindrical housing supported upon said mounting assembly so as to encompass said mirror, said housing containing a slot substantially parallel with the axis of rotation of said mirror; and
  (E) a selected number of color panels positioned within said housing along the inside of said cylindrical housing, said panels terminating in end portions passing through said slot such that selected portions of said panels may be exposed to said mirror as it rotates, permitting observation of said panels exposed to said mirror during rotation thereof.

5. A dry color mixer as in claim 4, including projector means detachably mounted upon said cylindrical housing.

6. A dry color mixer as in claim 5, wherein said projector means terminates in a cylindrical off-set lip portion complimentarily configured so as to rest in abutting relationship against the top of said cylindrical housing.

7. A dry color mixer as in claim 4, including scale means for measuring directly the percentage of color exposed by each of said panels to said mirror.

8. A dry color mixer as in claim 7, including a second scale for directly translating the percentage of color of exposed panels to quantities of coloring required.

References Cited

UNITED STATES PATENTS

| 2,606,373 | 8/1952 | Lamberger | 35—28.3 |
| 3,184,864 | 5/1965 | Johnson | 35—28.3 |

EUGENE R. CAPOZIO, *Primary Examiner.*

HARLAND S. SKOGQUIST, *Assistant Examiner.*

U.S. Cl. X.R.

35—58